US012213597B2

(12) United States Patent
Zenzmaier (10) Patent No.: US 12,213,597 B2
(45) Date of Patent: Feb. 4, 2025

(54) BODY-POSITIONING APPARATUS (71) Applicant: Cornelia Zenzmaier, Laßnitzhöhe (AT)

(72) Inventor: Cornelia Zenzmaier, Laßnitzhöhe (AT)

( * ) Notice: Subject to any disclaimer, the term of this patent is extended or adjusted under 35 U.S.C. 154(b) by 589 days.

(21) Appl. No.: 17/594,326

(22) PCT Filed: Mar. 19, 2020

(86) PCT No.: PCT/AT2020/060114
§ 371 (c)(1),
(2) Date: Oct. 11, 2021

(87) PCT Pub. No.: WO2020/215109
PCT Pub. Date: Oct. 29, 2020

(65) Prior Publication Data
US 2022/0202201 A1 Jun. 30, 2022

(30) Foreign Application Priority Data
Apr. 26, 2019 (AT) .................................. 50386/2019

(51) Int. Cl.
*A47C 31/12* (2006.01)
*A47C 7/14* (2006.01)
(Continued)

(52) U.S. Cl.
CPC .............. *A47C 31/126* (2013.01); *A47C 7/14* (2013.01); *A47C 7/142* (2018.08); *A47C 7/144* (2018.08);
(Continued)

(58) Field of Classification Search
None
See application file for complete search history.

(56) References Cited

U.S. PATENT DOCUMENTS

| 4,643,481 A * | 2/1987 | Saloff ................ A61G 7/05715 |
| | | 297/DIG. 2 |
| 2010/0117414 A1* | 5/2010 | Hwang .................. B60N 2/665 |
| | | 297/217.3 |

(Continued)

FOREIGN PATENT DOCUMENTS

| DE | 202016102473 U1 | 8/2017 | |
| DE | 102018100449 B4 * | 11/2020 | ............... B60N 2/04 |

(Continued)

OTHER PUBLICATIONS

International Search Report and Written Opinion, English Translation, from PCT/AT2020/060114 filed Mar. 19, 2020, mailed May 18, 2020.

*Primary Examiner* — David E Allred
(74) *Attorney, Agent, or Firm* — Workman Nydegger (57) ABSTRACT

An apparatus (1) for positioning the body of a user (100), wherein the apparatus can be used in a seat or in the form of a rest, comprising a seating element (20), a pelvis and lumbar-spine module (13) and a computer unit (40), wherein the pelvis and lumbar-spine module comprises an adjusting element (117) and a sensor (113), and the seating element comprises an adjusting element (108) and three sensors (111, 112), wherein the sensors (111, 112, 113) sense seat-related and rest-related pressures, wherein the computer unit activates the adjusting elements, wherein a first and second sensor (112) and a third sensor (111) sense the seat-related pressure of the first and second ischial tuberosities (102) and of the coccyx (104), wherein the first and the second ischial tuberosities define an ischial-tuberosity level, wherein the adjusting element of the seating element compensates for the ischial-tuberosity level horizontally about the user's sagittal axis, and whereupon the adjusting element of the pelvis and lumbar-spine module tilts the user's pelvis (101) about the (Continued)

horizontal axis of the same until the seat-related and/or rest-related pressure of the coccyx has a value substantially equal to zero.

13 Claims, 2 Drawing Sheets

(51) Int. Cl.
    *A47C 7/46*         (2006.01)
    *A47C 7/72*         (2006.01)
    *A47C 9/00*         (2006.01)
    *B60N 2/02*         (2006.01)
    *B60N 2/90*         (2018.01)
    *G05B 19/05*        (2006.01)
    *G05B 19/4155*    (2006.01)

(52) U.S. Cl.
    CPC .............. *A47C 7/46* (2013.01); *A47C 7/462* (2013.01); *A47C 7/467* (2013.01); *A47C 7/72* (2013.01); *A47C 9/002* (2013.01); *B60N 2/0268* (2023.08); *B60N 2/0273* (2023.08); *B60N 2/914* (2018.02); *B60N 2002/0212* (2013.01); *B60N 2002/0216* (2013.01); *B60N 2002/022* (2013.01); *G05B 19/054* (2013.01); *G05B 19/4155* (2013.01); *G05B 2219/37399* (2013.01)

(56) References Cited

U.S. PATENT DOCUMENTS

| | | | |
|---|---|---|---|
| 2015/0051526 A1 | 2/2015 | Wang et al. | |
| 2017/0086588 A1 | 3/2017 | Patrick et al. | |
| 2019/0193610 A1* | 6/2019 | Ketels | B60N 2/72 |
| 2019/0248260 A1* | 8/2019 | Yoshikawa | B60N 2/2222 |
| 2022/0055510 A1* | 2/2022 | Mizoi | B60N 2/646 |
| 2022/0371475 A1* | 11/2022 | Dillinger | B60N 2/0881 |
| 2023/0038920 A1* | 2/2023 | Mizoi | G01B 11/26 |
| 2024/0083306 A1* | 3/2024 | Main | B60N 2/643 |
| 2024/0083315 A1* | 3/2024 | Mizoi | B60N 2/77 |

FOREIGN PATENT DOCUMENTS

| | | | | |
|---|---|---|---|---|
| WO | WO-2015011803 A1 * | 1/2015 | | A47C 1/024 |
| WO | WO-2016128685 A1 * | 8/2016 | | A01B 75/00 |
| WO | WO-2017153526 A1 * | 9/2017 | | B60N 2/002 |
| WO | WO-2019193040 A1 * | 10/2019 | | B60N 2/10 |
| WO | WO-2021048206 A1 * | 3/2021 | | B60N 2/02246 |

* cited by examiner

BODY-POSITIONING APPARATUS

An apparatus for positioning the body of a user, wherein the apparatus may be integrated into a seat or a lounger or may be used as a cushion, comprising a seating element, a back element having a pelvis and lumbar-spine module and a computer unit, wherein the back element is connected to the seating element, wherein the pelvis and lumbar-spine module comprises at least an adjusting element and at least a sensor, and wherein the seating element comprises at least an adjusting element and at least three sensors, wherein the sensors are connected to the computer unit and configured to sense seat-related and rest-related pressures of the user in the seating element and in the pelvis and lumbar-spine module, wherein the computer unit is connected to the adjusting elements and configured to evaluate the seat-related and rest-related pressures and to activate the adjusting elements.

The invention further relates to a method for operating such an apparatus.

Users are often not aware of their own individual posture when standing, sitting or lying, assuming positions, which cause unilateral painful muscle contractures and, in the long run in the case of incorrect load distribution of the spinal and pelvis structure, may lead to wear processes, also spinal disc herniation. In particular sitting over long periods of time requires a permanent static posture of the muscles, often at incorrect load distribution and without sufficient compensating movements, which is the cause of muscular dysbalances and may promote a variety of pains of the body.

The pelvis of the user assumes a central role to prevent malpositions and to obtain an optimal body position. Apparatuses for pelvis positioning have been widely known from the field of ergonomics. US20170086588A1 discloses an air chamber system, comprising two laterally distanced air chamber elements integrated into the seat surface of a seat, which in the case of unbalanced seating will position the pelvis of the sitting user by balancing the ischial tuberosities by way of supplying and discharging air using a compressor. One region of the air chamber elements is configured to be mobile, whereby the femur position of the user may be adjusted. Into the air chamber elements there are integrated contact pressure sensors, which sense seat-related pressures applied onto the seat surface by the ischial tuberosities of the user. A controller evaluates the seat-related pressures and controls the compressor according to the evaluation.

In the apparatus for body positioning according to prior art, there are sensed only the seat-related pressures of the ischial tuberosities of the user in order to achieve an improved posture and the positioning of the same as well as of the femur is realized. This apparatus, however, has several disadvantages.

In order to achieve an improved body position while seating, the coccyx of the user in an upright sitting position has to be free of any loads. This cannot be realized by the simple sensing of the seat-related pressures of the ischial tuberosities and the positioning of the same, which is why the apparatus of prior art will improve the posture of the user in only a limited way. In addition, positioning of the user is substantially realized about the sagittal axis of the same, whereby changes of the spinal curvature, such as, for example, a kyphosis, cannot be prevented. Furthermore, positioning of the femur of the user in a substantially upright seating position does not offer a sufficient possibility to position the pelvis in such a way that there may be achieved an improvement of the posture in the region of the spinal column.

A further disadvantage of apparatuses known, such as wheel chairs, is the result of an anatomically reasonable support in the region of the thoracic spine being taken into account in an insufficient way or not at all, whereby the development of a kyphosis will be promoted. If this disadvantage coincides with the lack of posture promoting seating elements in an apparatus, this will lead, especially for elder or immobile persons, to problems detrimental to health.

The task of the invention, hence, is to provide an apparatus and a method for positioning the body of a user, which prevent the disadvantages of prior art.

This task is solved by providing an apparatus as well as a method for positioning the body of a user.

The present invention provides an apparatus for positioning the body of a user, wherein a first sensor and a second sensor and a third sensor are configured to sense the seat-related pressure of the first and second ischial tuberosities and the seat-related pressure of the coccyx in a substantially upright seating position of the user, wherein the first and the second ischial tuberosities define an ischial-tuberosity level, wherein the adjusting element of the seating element is configured to compensate for the ischial-tuberosity level horizontally about the sagittal axis of the user in the case of seat-related and/or rest-related pressure differences, and whereupon the adjusting element of the pelvis and lumbar-spine module is configured to tilt the pelvis of the user about the horizontal axis of the same until the seat-related and/or rest-related pressure of the coccyx has the value of substantially equal to zero. In addition, in the region of the sacrum and the coccyx of the user there will develop, when transitioning from an substantially upright seating position into a position inclined about the horizontal axis of the user, seat-related and/or rest-related pressures as a function of the inclination of this position, wherein in the lying body position, there will develop in the region of the sacrum substantially maximal seat-related and/or rest-related pressures. Due to the presence of an additional third sensor in the seating element and a sensor in the pelvis and lumbar-spine module in the region of the sacrum of the user it is possible to sense, apart from the seat-related pressures of the ischial tuberosities of the user, also the seat-related and/or rest-related pressure of the coccyx and sacrum of the same. In this way, there is obtained the advantage that it is possible at the apparatus to sense forces, which are transferred longitudinally along the spine of the user due to a malposition or during the unrolling of the pelvis of the same by adjusting movements of the adjustment elements for the purpose of body positioning or during a change of the inclination of the back element, from the spine of the user via the sacrum of the same onto the coccyx and the ischial tuberosities. Based on the seat-related and/or rest-related pressure of the coccyx, the adjustment elements of the pelvis and lumbar-spine module may tilt the pelvis of the user such that the coccyx will become substantially free of any loads. This solves the problem of apparatuses for body positioning according to prior art, wherein the sensors sense only seat-related pressures of the ischial tuberosities of the user and balance the ischial tuberosities, not taking into account, however, any tilting of the pelvis, which constitutes an essential integral part of body positioning, and which is why the coccyx may be exposed to high seat-related pressures in the case of a malposition. Due to the presence of a sensor for sensing the coccyx pressure and a sensor for sensing the pressure in the region of the sacrum, it is possible to sense the unrolling process of the pelvis, during the transition of the user into a lying position, by seat-related and/or rest-related pressure differences as a function of the inclination of the position in the case of a changed seating or lying position, respectively.

Another advantage is obtained by the fact that the present invention may be integrated into an already existing seat or a lounger or may be used as a cushion on a chair or bed. In this way, there is developed a plurality of possible uses, wherein the apparatus is not limited to the following examples. The apparatus may, for example, be integrated into the following devices: office chairs, wheel chairs, vehicle seats, children retaining systems, training systems, mattresses or in the field of rehabilitation and therapy, in particular in standing boards, standing beds and/or operation tables.

Another advantage is given by the fact that body positioning may be realized by means of the adjusting elements of the seating and back element in a force-fit and self-regulating way by the proper weight of the user and/or by the proper movements of the same. In addition, the computer unit, which activates the adjusting elements, may be controlled by the user himself and/or in the case of older immobile people by third parties such as, e.g., a care-giver.

According to a preferred embodiment of the apparatus for positioning the body of a user the back element preferably has a three-part thoracic-spine module as well as a cervical-spine and head module, wherein the thoracic-spine module may be connected to the pelvis and lumbar-spine module situated underneath and the cervical-spine and head module may be connected to the thoracic-spine module situated underneath, preferably mechanically by means of fluid-filled channels or electrically, by way of a wired or wireless connection via Bluetooth or WLAN and/or a combination thereof. By way of the three-part thoracic-spine module and the preferably four-part pelvis and lumbar-spine module there is obtained the advantage that also users having severe impairments such as a pathological rotation formation of the spinal column or scoliosis may be segmentally supported, positioned and mobilized. Another advantage is contained in the fact that the apparatus preferably provides for supporting stabilization and mobilization measures without fixation, wherein an improved sitting and lying position in the region of the pelvis and the thoracic spine may be achieved. The cervical spine of the user is thereby indirectly co-influenced by the supported thoracic spine or shoulder region, respectively, whereby the individually adjustable cervical-spine and head module of the user may be additionally stabilized and mobilized.

According to a preferred embodiment of the apparatus for positioning the body of a user the back element has further adjusting elements, for example for positioning and supporting the spine in the transition area of a lordosis into a kyphosis, or for laterally supporting immobile persons having instabilities of the trunk, which are configured, by alternating and/or synchronous adjusting movements, in particular in the region of the spine, to position the user sagittally and about the longitudinal axis of the same, wherein the computer unit is configured to carry out the adjusting movements movements in the pelvis and lumbar-spine module, in the thoracic-spine module and in the cervical-spine and head module in succession to one another, wherein in the already positioned adjusting elements of the seating and/or back element there are not developed any substantial seat-related and/or rest-related pressure differences or changes of body positions, respectively. In this way, there is given the advantage that due to the adjusting movements in the form of alternating and/or synchronous upwards and downwards movements there may be applied pressure points and/or pressure regions in the pelvis and lumbar spine, thoracic spine, cervical spine and head region of the user, whereby the proprioceptive muscle work is stimulated, wherein the alternating movement applies unilaterally pressure onto the body and, on the other side, retreats back for the same amount such that the body of the user may react thereto via a compensating movement and may position and mobilize the back region. In particular in the articulated region between sacrum and pelvis, the alternating adjusting movements may have a positive effect. In addition, the adjustment elements will spare the spinous processes upon the activation of the same. Another advantage is obtained by the fact that the adjusting movements stabilize the body of the user segmentally by the detection of segmental seat-related and rest-related pressure differences in the adjusting element functionally associated with the adjusting element and that by sparing the spinous processes it may be prevented that the pressure-sensitive spinous processes are exposed to rest-related pressures during the positioning of the body, which lead to pain or pathological changes of the surrounding body tissue. In addition, it is possible to support the thoracic spine region centrally for an upright posture of the spine, wherein the shoulder blades may be positioned softer or lower, respectively, and rotational errors of the user may be compensated for about the longitudinal axis of the same by adjusting elements in the region of the shoulder blades. In addition, the freedom of movement of the upper extremities is increased by the lower or softer, respectively, positioning of the shoulder blades. As tilting of the pelvis, in the transition to load acquisition or load freedom, respectively, of the coccyx and of the sacrum and the adjusting movement of the thoracic-spine module in a sagittal positive and negative direction is terminated in that condition, in which pressure distribution or positioning of the pelvis, respectively, are obtained or remain substantially unchanged, there is obtained another advantage that a neutral position of the pelvis may be obtained or defined at any point of time in an inclined or lying body position. Due to the presence of sensors in the back element, in particular in the pelvis and lumbar-spine module, it is possible to detect any pelvis rotation malpositions, which may be compensated for by adjusting element in the same module by way of a rotation about the longitudinal axis of the user until there is obtained at the pelvis ridge of the user a uniform pressure distribution. Another advantage is obtained by the fact that the symmetric positioning of the pelvis may be carried out in all three body levels, whereby the lower extremities are functionally decoupled from the osseous pelvis structure of the user. In this way, foot contractions and pelvis malpositions causing malpostures of the spine in an upright standing position and through walking may be compensated for if no fixed body changes are existent. In the case of fixed body changes, the adjusting movements, however, may have a positive effect. By way of the individual positioning or support, respectively, of the pelvis and the spine structure as well as the segmental mobilization and stabilization of the same, incorrect use due to a user's lack of knowledge on his/her own posture may be excluded. Another advantage of the present invention is obtained by the fact that for users having a pronounced kyphosis or strong deviation from the "normal" sagittal orientation of the spine, respectively, predominantly the region of the lumbar spine and at least the transitional region to the thoracic spine may be supported in relation to the pelvis, hence, delaying or even preventing a deterioration of the condition of the body.

According to a preferred embodiment of the apparatus for positioning the body of a user the apparatus has a leg element, wherein the leg element is connected to the seating element and comprises further adjusting elements and sensors. In this way, there is given the advantage that by activating the adjust elements the user will maintain the neutral position of the pelvis during the transition of the same from a sitting position into a lying position, wherein this is in an inclined position or in a lying body position, taking into account the muscular influences of the lower extremities, in particular those of the femur directly connected to the pelvis, onto the pelvis in the inclined position, the result of the fact that the heels of the user according to the anatomical bone structure of the same rest above the level of the coccyx or sacrum of the same or the ischial tuberosity level. Another advantage of the adjusting elements of the leg element is obtained by the fact that the activation of the same in combination with the neutral pelvis position of the user may prevent venostasis and create a type of "vein pump". The leg element may be connected to the seating element preferably mechanically, via fluid-filled channels or electrically, by a wired or wireless connection created by means of, e.g., Bluetooth or WLAN, and/or a combination thereof.

According to a preferred embodiment of the apparatus for positioning the body of a user the adjusting elements comprise actuators selected from the group consisting of mechanic, electric, pneumatic or hydraulic actuators, this is, for example, an electric servomotor, an air pump or a hydraulic pump. In this way, there is given the advantage that positioning of the body of the user may be carried out by a plurality of adjusting elements. For example, the user, when using a fluid-filled chamber system, may be positioned in a force-fit way by redistributing the fluid due to its proper weight or due to the use of a pump device. Furthermore, electrical linear drives may position the user by corresponding activation of the same by a computer unit. In this way, there is obtained the advantage that no circuits, defined by valves, such as, for example, in a force-fit-controlled chamber system, will be required. There may also be used hydraulic linear drives for the positioning of the body. In this way, there would be obtained the advantage that large forces may be applied for the positioning of the body, whereby immobile users, in particular bed-ridden or quadriplegic persons, may be exactly positioned and mobilized. The term of the adjusting elements, however, is not restricted to the examples mentioned above.

According to a preferred embodiment of the apparatus for positioning the body of a user the sensors are configured as mechanic, electric, pneumatic or hydraulic sensors. Thereby, there is given the advantage that the seat-related and/or rest-related pressures of the user may be sensed by a plurality of sensors. For example, when using a fluid-filled chamber system, there may be used pressure sensors, which sense seat-related and/or rest-related pressures by means of pressure differences in the chambers. Furthermore, also mechanic sensors such as strain gauges or also accelerometers may be used for sensing the seat-related and/or rest-related pressures. The term of sensors, however, is not restricted to the examples mentioned above.

The method according to the invention for operating an apparatus for positioning the body of a user comprises sensing the seat-related and/or rest-related pressure of the ischial tuberosities of the user by the first and second sensor, evaluating the seat-related and/or rest-related pressures and, in the case of seat-related and/or rest-related pressure differences, activating the adjusting element of the seating element by the computer unit, horizontally compensating for the ischial tuberosity level of the user about the sagittal axis of the same, sensing the seat-related pressure of the coccyx of the user by the third sensor of the seating element, evaluating the seat-related and/or rest-related pressure of the coccyx of the user by the computer unit, activating the adjusting element of the pelvis and lumbar-spine module by the computer unit for tilting the pelvis of the user about the horizontal axis of the same into a positive and/or negative sagittal direction, and terminating the adjusting movement of the adjusting elements by the computer unit as soon as the seat-related and/or rest-related pressure of the coccyx has a value equal substantially zero during tilting. By sensing the region of the coccyx and sacrum of the user, there may be in particular sensed forces at the apparatus, which are transferred longitudinally along the spine of the user due to his malposition or during the unrolling process of the pelvis of the same by way of adjusting movements of the adjusting elements for the purpose of positioning the body at the apparatus. In addition, there may also be sensed forces at the apparatus, which are transferred due to a change in inclination of the back element from the spinal column of the user via the sacrum of the same onto the coccyx and the ischial tuberosities. Due to the presence of sensor in the pelvis and lumbar-spine module of the back element there is obtained another advantage by the fact that rotational pelvis malpositions may be sensed, which may be compensated for by adjusting elements in the same module by way of a rotation about the longitudinal axis of the user until there is achieved in the region of the pelvis ridge of the user a uniform seat-related and/or rest-related pressure distribution. Another advantage is obtained by the fact that due to the presence of a sensor for sensing the seat-related and/or rest-related pressure of the coccyx and a sensor for sensing the seat-related and/or rest-related pressure of the sacrum it is possible to sense the unrolling process of the pelvis during the transition of the user, by way of seat-related and/or rest-related pressure differences as a function of the inclination of the body position, in the case of a changed sitting or lying position, respectively. In this way, there may be maintained a neutral position of the pelvis also in a lying body position.

According to a preferred embodiment the method for positioning the body of a user comprises, following the compensation of the ischial tuberosity level and the tilting process of the pelvis of the user's pelvis, positioning and sagittal supporting of the user in the region of the thoracic spine by activating the adjusting elements of the thoracic-spine modules by the computer unit, wherein the adjusting movements spare the region of the spinous processes, sensing the seat-related and rest-related pressure differences by the sensors of the seating and back element, evaluating the seat-related and rest-related pressures by the computer unit, terminating the adjusting movement of the adjusting element of the thoracic-spine module by the computer unit as soon as there is sensed a substantial seat-related and/or rest-related pressure difference in the adjusting elements of the seating element and/or the pelvis and lumbar-spine module, subsequent positioning and sagittal supporting the user in the thoracic spine and head region of the same by activating the adjusting elements of the cervical-spine and head module by the computer unit, terminating the adjusting movement of the adjusting elements by the computer unit as soon as there is sensed a seat-related and/or rest-related pressure difference in the adjusting elements of the thoracic-spine module. In this way, there is obtained the advantage that by alternating pressure points and/or pressure regions in the pelvis and lumbar spine, thoracic spine, cervical spine and head region the proprioceptive muscle work may be stimulated by the adjusting movement, wherein the movement applies unilaterally pressure onto the body and, on the other side, retreats for the same amount, such that the body may react thereto by way of a compensating movement and, in this way, the back region of the user may be segmentally mobilized. Another essential advantage is obtained by the fact that the positioning of the pelvis of the user is realized in all three body levels, whereby there may be assumed a neutral sitting position. Another advantage is obtained by the fact that there will not develop any pathological pressure locations in the region of the coccyx and the sacrum, which may lead due to the osseous structure to strong pains and tissue damage, in particular with immobile users.

According to an embodiment the method for positioning the body of the user is carried out in an inclined position of the back element. In this way, there is obtained the advantage that body positioning may also be carried out in already existing devices such as, for example, car seats or aeroplane seats, as these device are usually configured having an inclined back element. In addition, users having severe body impairments such as scoliosis may be positioned, stabilized and mobilized more easily in an inclined position.

According to an embodiment of the method the adjusting elements are activated at a location of the leg element at an inclined position of the back element and an inclined position of the seating element by the computer unit until the heel of the user is at least at the level of the ischial tuberosities. In this way, there is obtained the advantage that hyperlordosis developing due to the tilting of the pelvis of the user in the positive sagittal direction and forces developing at the spinal column may be prevented. Another advantage is maintained as a neutral position of the pelvis of the user in a lying position may be maintained by activating the adjusting elements of the leg element.

According to an embodiment the method for positioning the body of a user comprises, following the positioning of the user, post-positioning the user in cyclic intervals and/or at a segmental pressure difference of pre-defined seat-related and rest-related pressure ranges, activating the adjusting elements of the apparatus in a horizontal level of the back element and/or the seating element and/or the leg element in the form of synchronous and/or alternating adjusting movements segmentally upwards and/or downwards in succession to one another or in any order along the longitudinal axis, wherein the synchronous adjusting movements are realized in the positive as well as negative sagittal direction and the alternating adjusting movements are realized in the form of a rotation about the longitudinal axis, wherein the adjusting movement is realized unilaterally in the positive sagittal direction and, on the other side, for the same amount in the negative sagittal direction, activating the adjusting element of the seating element in the form of synchronous or alternating adjusting movements and activating adjusting elements of the leg element in the form of synchronous and/or alternating adjusting movements. In this way, there is obtained the advantage that body positioning may be realized automatically within a time interval, or dynamically, in particular in a self-regulating way, because of an incorrect malposture of the user stressing the osseous structures of the body too much. Furthermore, following the segmental positioning of the back region of the user by activating adjusting elements in the form of impulse-like adjusting movements in succession to one another along the leg element, there is obtained the advantage that the core muscles of the user are stimulated in the immediate region of the spine of the same and supported in the correct individual posture at this point of time. The apparatus is able to activate, starting from the spine and pelvis support, pressure points and regions changing the muscle tonicity in order to strengthen the core muscles, to train the body posture of the user and to cause an incremental improvement of the individual condition towards an improved, in particular perpendicular, orientation of the spine in regard to the pelvis. The neutral position of the spine and of the pelvis is maintained in any inclined position of the apparatus.

The invention is now explained in greater detail in regard to the drawings by way of embodiment examples.

Figure 1:
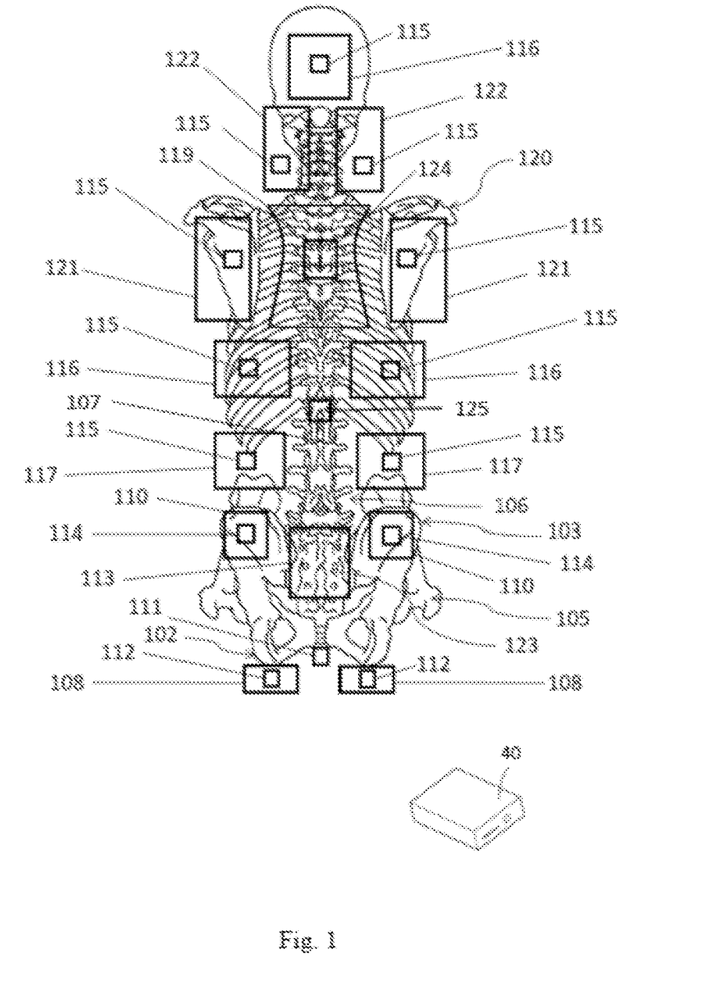
FIG. 1 shows a schematic depiction of the apparatus according to a preferred embodiment variant of the invention.
Figure 2:
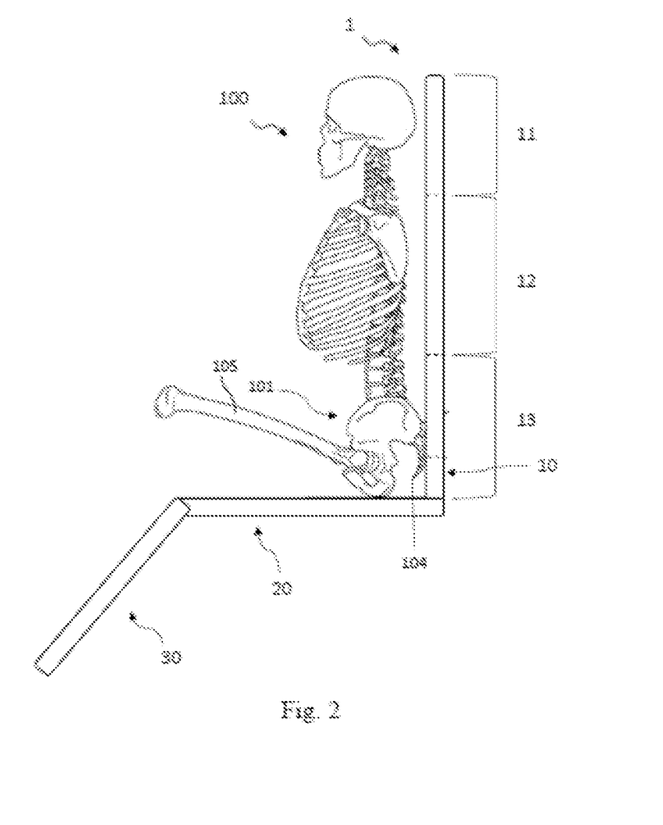
FIG. 2 shows a side view of the apparatus according to FIG. 1.

In the following the invention will be described by way of the figures in detail. FIG. 1 and FIG. 2 are schematic depictions of an apparatus 1 for positioning the body of a user 100 while sitting according to the present invention. The apparatus 1 may be integrated into a seat or a lounger or used as a cushion on a chair or on a lounger or on a bed and comprises a seating element 20, a back element 10 having a pelvis and lumbar-spine module 13 and a computer unit 40. The back element 10 further has a thoracic-spine module 12 and a cervical-spine and head module 11, wherein the thoracic-spine module 12 is connected to the lumbar spine module 13, the cervical-spine and head module 11 is connected to the thoracic-spine module 12 and the back element 10 is connected to the seating element 20 preferably mechanically by way of fluid-filled channels. The pelvis and lumbar-spine module 13 comprises at least four adjusting elements 117 and 110 and at least three sensors 114 and 113 and the seating element 20 at least two adjusting elements 108 and at least three pressure sensors 111 and 112, wherein the adjusting elements 108 are configured as self-inflatable, deformable and fluid-filled chambers and are connected to one another by channels having valves. The pressure sensors 111 and 112, 114 and 113 are configured to sense seat-related and rest-related pressures of the user 100, wherein the computer unit 40 is connected to the chambers, in particular to the valves, and to the pressure sensors 111 and 112, 114 and 113, wherein the connections are not depicted in the figures for a better survey. The pressure sensors 112, due to their position within the seating element 20, are configured to sense the seat-relates pressure of the first and second ischial tuberosities 102, wherein the first and second ischial tuberosities 102 define an ischial tuberosity level. The pressure sensor 111, due to its position within the seating element 20, is configured to sense the seat-related pressure of the coccyx 104 of the user 100. The chambers of the seating element 20 are configured, in the case of seat-related pressure differences, to compensate for the ischial tuberosity level horizontally about the sagittal axis of the user 100, wherein the fluid is drained from the chamber having the higher internal pressure of the seating element 20 and, in a force-fit way, pumped due to the proper weight of the user 100 by means of the channels connecting the chambers into the chambers of the pelvis and lumbar-spine module 13. The pressure sensors 114 and 113 in the pelvis and lumbar-spine module 13, due to their position within the back element 10, are configured to sense the pressure of the pelvis ridge 103 and the pressure of the sacrum 123. The chambers of the pelvis and lumbar-spine module 13 are configured to tilt the pelvis 101 of the user 100 by the re-distributed fluid about the horizontal axis of the same and the longitudinal axis of the same, preferably mutually alternately or alternatingly, respectively, until the seat-related pressure of the coccyx 104 preferably in an upright sitting position substantially has a value equal to zero in the fringe region upon stress and load freedom of the coccyx 104 and the rest-related pressure difference of the pelvis ridge 103 of the user has in the chambers 110 in the region of the pelvis and lumbar-spine module substantially a value of equal zero, whereby the user 100 obtains a neutral position of the pelvis when sitting.

The back element 10 of the apparatus 1 for positioning the body of a user 100 further has further chambers 116, 121 and 119 in the thoracic spine region and a sensor 125 in the transition region between lordosis and kyphosis. The chambers are configured, upon obtaining a neutral position of the pelvis, to position by way of adjusting movements, in particular by alternating and/or synchronous pumping of the same, in particular in the region of the spinal column 106, the user 100 sagittally and about the longitudinal of the same, wherein the chambers 116, 121 and 119 spare the spinous processes 107 of the user 100 during the pumping process. The sensor 125 of the transition region serves for sensing a control position of the user 100. Adjusting movements are realized in a force-fit way, by the proper weight of the user 100, and are carried out in succession to one other in the pelvis and lumbar-spine module 13, in the thoracic-spine module 12 and in the cervical-spine and head module 11. Furthermore, the apparatus 1 has a leg element 30, wherein the leg element 30 is connected to the seating element 20 preferably mechanically by fluid-filled channels and comprises further chambers and pressure sensors, which are not depicted in the figures. The chambers are used for supporting the lower extremities, wherein the neutral position of the pelvis and of the spinal column and the distribution of the pressure existing in the chambers in the inclined position of the back element is maintained. The re-distribution of the fluid may be realized, apart from the proper weight of the user 100, also by the proper movements of the same. Adjusting movements in the seating element 20 and/or back element 10, in this way, may also be carried out without mechanic connection of seating element 20 and back element 10 by chambers connected in the respective element. The user 100 activates any adjusting elements of the leg element 30 for changing the position of the femurs 105 or for supporting the heels. The user 100 causes, due to the proper weight of the same, a re-distribution of fluids, as long as there are not developed any substantial rest-related and/or seat-related pressure differences in the region of the pelvis, or in the application in an inclined position of the user and the extended legs of the same, as long as the heels of the users, by the adjusted pressure distribution, remain rested at least at the level of the ischial tuberosities.

According to a method of the invention the seat-related pressures are sensed at the ischial tuberosities 102 of the user 100 by a first and second pressure sensor 112 and evaluated by a computer unit 40. The computer unit 40, preferably a processor, activates, in the case of seat-related pressure differences, the chambers 108, in particular the valves contained in the connecting channels, of the seating element 20 and compensates for the ischial tuberosity level of the user 100 by draining the fluid out of the chamber 108 provided with the higher internal pressure of the seating element 20 in a horizontal way. Subsequently thereto, the seat-related coccyx pressure of the user 100 is sensed by the third sensor 111 and evaluated by the computer unit 40. Independently of the value sensed of the seat-related and/or rest-related pressure of the coccyx, the excess fluid drained in the preceding method step and optionally additional fluid is pumped, by the proper weight of the user 100, from the chambers of the apparatus having higher internal pressure in the region of the seating element to the chambers 117 of the pelvis and lumbar-spine module 13, wherein the chambers 117 tilt the pelvis 101 of the user 100 alternately mutually, or alternatingly, respectively, about the horizontal axis of the same until the seat-related coccyx pressure in the transition region between load freedom and load acquisition has substantially a value of equal zero. Optionally, it is necessary for this method step for tilting the pelvis backwards to drain any excess fluid in order to reach this neutral range. Then the pressure of the pelvis ridge 103 and of the sacrum 123 is sensed by the sensors 114 and 113 for positioning the pelvis in the third body plane and evaluated by a computer unit 40. The computer unit activates, in case of rest-related pressure differences, the chambers 108, in particular the valves contained in the connecting channels of the seating element 20 and of the pelvis and lumbar-spine module 13, and compensates for the rest-related pressure of the user 100 by a pelvis rotation about the longitudinal axis, wherein the excess fluid is pumped from chambers having higher internal pressure, due to the proper weight of the user 100, into the chambers 110 until the distribution of the rest-related pressure will be compensated for.

According to the method of the invention there is then positioned, following the compensation of the tuberosity level, the tilting and rotation process of the pelvis 101 in the region of the pelvis and lumbar-spine module 13, the back region, in particular the thoracic and cervical spine, of the user 100 by way of alternating and/or synchronous adjusting movements, in particular by the force-fit pumping of further chambers 110, 116, 121, 119 and 122 of the back element 10, sagittally and about the longitudinal axis of the same. Thereby, the adjusting movements are carried out in the pelvis and lumbar-spine module 13, in the thoracic-spine module 12 and in the cervical-spine and head module 11 in succession to one another, wherein the region around the spinous processes 107 of the user 100 is spared at each and every positioning process in order to not apply any pressure onto the spinous processes 107. Due to this process, there will not develop substantially any seat-related and/or rest-related pressure differences or changes of body positions, respectively, in the already positioned adjusting elements of the seating element and/or back element.

According to the method for positioning the body there is then carried out, following the first-time body positioning of the user 100, cyclically, preferably in a time interval of seconds, minutes or hours, another positioning of the body. A new positioning of the body may also be the result of a deviation of the seat-related pressure difference of the ischial tuberosities or a deviation of the seat-related pressure of the coccyx from a pre-defined seat-related pressure difference range, or it is the result in particular in the region of segmental seat-related pressure changes of functionally associated adjusting elements.

According to the method for positioning a body, the positioning of the body of the user 100 is realized in an inclined position of the back element 10.

According to the method for positioning a body the adjusting elements, which are not depicted in the figures, are activated at a location of the leg element 30 in a inclined position of the back element 10 and an inclined position of the seating element 20 by the computer unit 40 until the heel of the user 100 is above the level of the ischial tuberosities.

Precedingly, there was explained an embodiment variant of the invention substantially without any active adjusting elements, as increased pressure in chambers that are more stressed by body weight, controlled by the computer unit 40, is used for inflating other chambers. By draining air from the apparatus 1, it is further possible, controlled by the computer unit 40, to change the sitting position. If the user 100 cannot get up from the seat, the chambers that are self-inflating due to form stability may then refill themselves into an initial condition.

According to alternative embodiment variants the adjusting elements may comprise actuators and the sensors selected from the group consisting of mechanic, electric, pneumatic or hydraulic active actuators and sensors. The present invention is in this way not restricted to fluid-filled chamber systems. For example, the user 100 may be positioned by linear drives 108, 117, 110, 116, 119, 121 and 122 that are activated by the computer unit 40 and electrically driven, wherein there may be used, instead of the pressure sensors 111, 112, 113, 114, 115, 124 and 125, for example, piezo elements for sensing the posture of the user 100. This electrically driven apparatus 1 allows the positioning of a body without any circuits defined by channels and valves. Another possibility for positioning the body of the user 100 may be realized by hydraulic adjusting elements 108, 117, 110, 116, 119, 121 and 122 such as, for example, a hydraulic cylinder in combination with flow rate sensors 111, 112, 113, 114, 115, 124 and 125. Another possibility for positioning the body of the user 100 may be realized by a combination of various adjusting elements. For example, the back element 10 may have mechanic, in particular fluid-filled, chambers 110, 116, 117, 119, 121 and 122, and the seating element may comprise electric adjusting elements 108 such as, for example, linear drives. Any further combination of adjusting elements will be included in this invention.

According to alternative embodiment variants all connections of the apparatus 1, which are indicated as mechanical, may also be configured to be electric, wired or wireless, for example by way of Bluetooth or WLAN, and these are not restricted to the example mentioned above.

The invention claimed is:

1. An apparatus for positioning the body of a user, wherein the apparatus may be integrated into a seat or a lounger or used as a cushion, comprising: a seating element, a back element having a pelvis and lumbar-spine module and a computer unit, wherein the back element is connected to the seating element, wherein the pelvis and lumbar-spine module comprises at least an adjusting element and at least a sensor, and wherein the seating element comprises at least an adjusting element and at least three sensors, wherein the at least three sensors are connected to the computer unit and configured to sense seating element and back element pressures from the user in the seating element and in the pelvis and lumbar-spine module, wherein the computer unit is connected to the adjusting elements and configured to evaluate the seating element and back element pressures and to activate the adjusting elements, characterized in that a first and a second sensor and a third sensor are configured to sense first and second ischial tuberosity pressures in the seating element and a coccyx pressure in the seating element and/or the back element when the apparatus is in a substantially upright seating position of the user, wherein the first and the second ischial tuberosities of the user are adapted to define respective ischial-tuberosity levels in the seating element, wherein the adjusting element of the seating element is configured to compensate for differences in the ischial-tuberosity levels such that the ischial tuberosity levels in the seating element are distributed substantially horizontally about a fore and aft axis of the apparatus in the case of seating element pressure differences and whereupon the adjusting element of the pelvis and lumbar-spine module is configured to tilt the pelvis of the user about a left-right axis of the apparatus until the coccyx pressure of the seating element and/or the back element has a value substantially equal to zero.

2. An apparatus according to claim 1, characterized in that in the region of the sacrum and the coccyx of the user, when transitioning from a substantially upright seating position into a position adapted to be inclined about the horizontal axis of the user, the seating element and/or back element pressures will develop as a function of the inclination of this position, wherein in the lying position in the region of the sacrum there will develop substantially maximal seating element and/or back element pressures.

3. An apparatus according to claim 1, characterized in that the back element has a thoracic-spine module and a cervical-spine and head module, wherein the thoracic-spine module and the cervical-spine and head module are connected to one another and/or individually with the pelvis and lumbar-spine module and/or individually with the seating element.

4. An apparatus according to claim 1, characterized in that the back element comprises further adjusting elements, which are adapted to position the user by way of alternating and/or synchronous adjusting movements, in particular in the region of the spine, sagittally and about the longitudinal axis of the same, wherein the computer unit is configured to carry out the adjusting movements in the pelvis and lumbar-spine module, in the thoracic-spine module and in the cervical-spine and head module in succession to one another, wherein in the adjusting elements already positioned of the seating element and/or back element there will not develop substantially any seating element and/or back element pressure differences or changes of the body's position, respectively.

5. An apparatus according to claim 4, characterized in that the adjusting element of the pelvis and lumbar spine module and the further adjusting elements are adapted to spare the spinous processes of the user from experiencing additional pressure upon the activation of these adjusting elements.

6. An apparatus according to claim 1, characterized in that the apparatus has a leg element, wherein the leg element is connected to the seating element and comprises further adjusting elements and further sensors.

7. An apparatus according to claim 1, characterized in that the adjusting elements comprise actuators selected from the group consisting of mechanic, electric, pneumatic or hydraulic actuators.

8. An apparatus according to claim 1, characterized in that the sensors and further sensors comprise sensors selected from the group consisting of mechanic, electric, pneumatic or hydraulic sensors.

9. A method for operating an apparatus according to claim 1, wherein the method comprises the following steps:
   a) sensing the seating element and/or back element pressures of the ischial tuberosities of the user by the first and second sensor;
   b) evaluating the seating element and/or back element pressures and, in the case of seating element and/or back element pressure differences, activing the adjusting element of the seating element by the computer unit;
   c) horizontally compensating for differences in the ischial tuberosity levels of the user about the sagittal axis of the user such that the tuberosity levels of the user are substantially the same and aligned horizontally with each other;

d) sensing the seating element pressure of the coccyx of the user by the third sensor of the seating element;
e) evaluating the seating element and/or back element pressure of the coccyx of the user by the computer unit;
f) activating the adjusting element of the pelvis and lumbar-spine module by the computer unit to tilt the pelvis of the user about the horizontal axis of the user into a positive and/or negative sagittal direction;
g) terminating the adjusting movement of the adjusting elements by the computer unit as soon as the seating element and/or back element pressure of the coccyx has a value substantially equal to zero during tilting.

10. A method according to claim 9, wherein the method, following the ischial-tuberosity level compensation and the tilting process of the pelvis of the user, includes the following steps:
a) positioning and sagittally supporting the user in the region of the thoracic spine by activating at least some adjusting elements of the thoracic-spine module by the computer unit, wherein the adjusting movements spare the spinous processes in the region of the thoracic-spine module;
b) sensing seating element and/or back element pressure differences by the sensors and at least one additional sensor of the seating element and back element;
c) evaluating the seating element and/or back element pressures by the computer unit;
d) terminating the adjusting movement of the adjusting element of the thoracic-spine module by the computer unit as soon as an essential seating element and/or back element pressure difference in the adjusting elements of the seating element and/or of the pelvis and lumbar-spine module is being sensed;
e) subsequently positioning and sagittally supporting the user in the region of the cervical spine and head region of the user by activating adjusting elements of the cervical-spine and head module by the computer unit;
f) terminating the adjusting movement of the adjusting elements of the cervical-spine and head module by the computer unit as soon as an essential seating element and/or back element pressure difference in the adjusting elements of the thoracic-spine module is being sensed.

11. A method according to claim 9, characterized in that the body positioning of the user is realized in an inclined position of the back element.

12. A method according to claim 9, characterized in that further adjusting elements are activated at a location of a leg element in an inclined position of the back element and an inclined position of the seating element by the computer unit until the heel of the user rests at or above the ischial-tuberosity levels.

13. A method according to claim 9, wherein the method, following the positioning of the user, comprises the following steps:
a) post-positioning the user in cyclic time intervals and/or at a segmental pressure difference of pre-defined seating element and/or back element pressure ranges;
b) activating further adjusting elements of the apparatus in a horizontal plane of the back element and/or of the seating element and/or of a leg element in the form of synchronous and/or alternating adjusting movements segmentally in succession to one another or in any order in a direction adapted to be along the longitudinal axis of the user, wherein the synchronous adjusting movements are realized in a positive as well as negative sagittal direction and the alternating adjusting movements are realized in the form of a rotation about the longitudinal axis, wherein the adjusting movement is realized unilaterally in a positive sagittal direction and on the other side for the same amount in a negative sagittal direction;
c) activating the adjusting elements of the seating element in the form of synchronous or alternating adjusting movements;
d) activating the further adjusting elements of the leg element in the form of synchronous and/or alternating adjusting movements.

\* \* \* \* \*